US009321207B2

(12) United States Patent
Osswald et al.

(10) Patent No.: US 9,321,207 B2
(45) Date of Patent: Apr. 26, 2016

(54) METHOD AND APPARATUS FOR MICROPELLETIZATION

(71) Applicant: Wisconsin Alumni Research Foundation, Madison, WI (US)

(72) Inventors: Tim Osswald, Madison, WI (US); Martin Launhardt, Erlangen (DE)

(73) Assignee: Wisconsin Alumni Research Foundation, Madison, WI (US)

( * ) Notice: Subject to any disclaimer, the term of this patent is extended or adjusted under 35 U.S.C. 154(b) by 313 days.

(21) Appl. No.: 13/787,217

(22) Filed: Mar. 6, 2013

(65) Prior Publication Data

US 2013/0234350 A1 Sep. 12, 2013

Related U.S. Application Data

(60) Provisional application No. 61/607,214, filed on Mar. 6, 2012.

(51) Int. Cl.
*B01J 2/04* (2006.01)
*B29B 9/06* (2006.01)
*B29C 47/00* (2006.01)
*B29C 47/12* (2006.01)
*B29C 47/34* (2006.01)
*B29C 47/88* (2006.01)

(52) U.S. Cl.
CPC ............... *B29C 47/0011* (2013.01); *B01J 2/04* (2013.01); *B29B 9/06* (2013.01); *B29C 47/0014* (2013.01); *B29C 47/0076* (2013.01); *B29C 47/12* (2013.01); *B29C 47/34* (2013.01); *B29C 47/8815* (2013.01)

(58) Field of Classification Search
None
See application file for complete search history.

(56) References Cited

U.S. PATENT DOCUMENTS

| | | | | | |
|---|---|---|---|---|---|
| 2,510,574 | A | * | 6/1950 | Greenhalgh | 264/9 |
| 3,060,510 | A | * | 10/1962 | Fischer et al. | 264/9 |
| 3,274,642 | A | * | 9/1966 | Cramer | 425/6 |
| 3,378,883 | A | * | 4/1968 | Lapple | 425/7 |
| 3,397,258 | A | * | 8/1968 | Williams | 264/9 |
| 4,303,603 | A | * | 12/1981 | Torobin | 264/69 |
| 5,063,002 | A | * | 11/1991 | Luker | 264/12 |
| 5,171,489 | A | * | 12/1992 | Hirao et al. | 264/8 |
| 5,280,884 | A | * | 1/1994 | Dorri | 266/202 |

OTHER PUBLICATIONS

Martin Launhardt. "Manufacturing of micropellets using Rayleigh disturbances." M.S. Mech. Engineering Thesis, University of Wisconsin-Madison, 96 pgs. (2011). Call No. AWO L383 M377.*
Launhardt, et al., "Manufacturing of Micropellets Using Rayleigh Disturbances" posterboard, Admitted Prior Art.

* cited by examiner

*Primary Examiner* — Mary F Theisen
(74) *Attorney, Agent, or Firm* — Armstrong Teasdale LLP (57) ABSTRACT

In a method and apparatus for micropelletization of a polymeric material, a melt thread of the polymeric material is formed by an extruder. A flowing gas is directed to the melt thread to form Rayleigh disturbances in the melt thread and break up the melt thread into discrete microdroplets. The discrete microdroplets are then solidified to form micropellets.

20 Claims, 10 Drawing Sheets

METHOD AND APPARATUS FOR MICROPELLETIZATION

CROSS-REFERENCE TO RELATED APPLICATIONS

This application claims priority from U.S. Provisional Patent Application Ser. No. 61/607,214, filed Mar. 6, 2012, which is herein incorporated by reference in its entirety.

BACKGROUND

The field of the invention relates generally to a method and an apparatus for micropelletizing a material, and more particularly, to a method and apparatus that utilizes Rayleigh disturbances to form micropellets.

Micropelletization is a relatively new technology that provides a variety of potential applications. Conventional pellets have cross-sectional dimensions (e.g., diameters) of 2.5 mm to 5 mm, while micropellets have cross-sectional dimensions (e.g., diameters) less than 2 mm, such as from 2 mm to about 50 microns, or even smaller.

In one example, the use of micropellets in polymer processing has noted benefits. For example, potential benefits of micropellets include: high surface to volume ratio, high bulk density, fast and even melting rates in extrusion, improved dry flow properties, faster injection molding cycles, and consequently lower energy consumption during processing. Moreover, more specialized sintering processes, such as laser sintering techniques, microporous plastics parts manufacturing, and other powder sintering methods actually depend on micropellets. In these processes, particle shape and size as well as size distribution play a significant role in process control and quality of the finished product. For example, wide ranges in size distribution deliver particles that may be too small when laser sintering, resulting in agglomeration of particles. Also, spherical particle geometries may be preferred with respect to reproducibility and surface quality.

Unfortunately, some of the conventional processes that can be found in the market produce micropellets that may not be uniform in shape and have wide ranges in size and shape distribution. Such conventional micropelletization processes are basically identical to the methods for producing standard pellet sizes. Some commercial processes for producing micropellets are thread and underwater pelletizers, which produce micropellets having cylindrical and spherical shapes, respectively. Both processes utilize cutters with blades. These cutters exert torsional forces that can produce micropellets with irregular shapes and surfaces.

SUMMARY

In one embodiment, a method of micropelletizing a material generally comprises forming a melt thread of the material. A flowing gas is directed to the melt thread to form Rayleigh disturbances in the melt thread and break up the melt thread into discrete microdroplets. The discrete microdroplets are then solidified to form micropellets.

In another embodiment, an apparatus for micropelletizing a material generally comprises a source of material and an extruder in communication with the source of material for extruding a continuous melt thread of the material, with the extruder generally comprising an extrusion die having a melt orifice through which the melt thread exits the extruder. A gas passage is in fluid communication with a source of pressurized gas and is adjacent to the melt orifice of the extrusion die. The gas passage is configured to direct pressurized gas from the source of pressurized gas such that the pressurized gas flows generally alongside and generally parallel to the melt thread as the melt thread exits the extruder. The source of pressurized gas and the gas passage are configured to produce a suitable flow of gas through the gas passage such that Rayleigh disturbances are formed in the melt thread and the melt thread breaks up into discrete microdroplets.

DETAILED DESCRIPTION OF THE DRAWINGS

Figure 1:
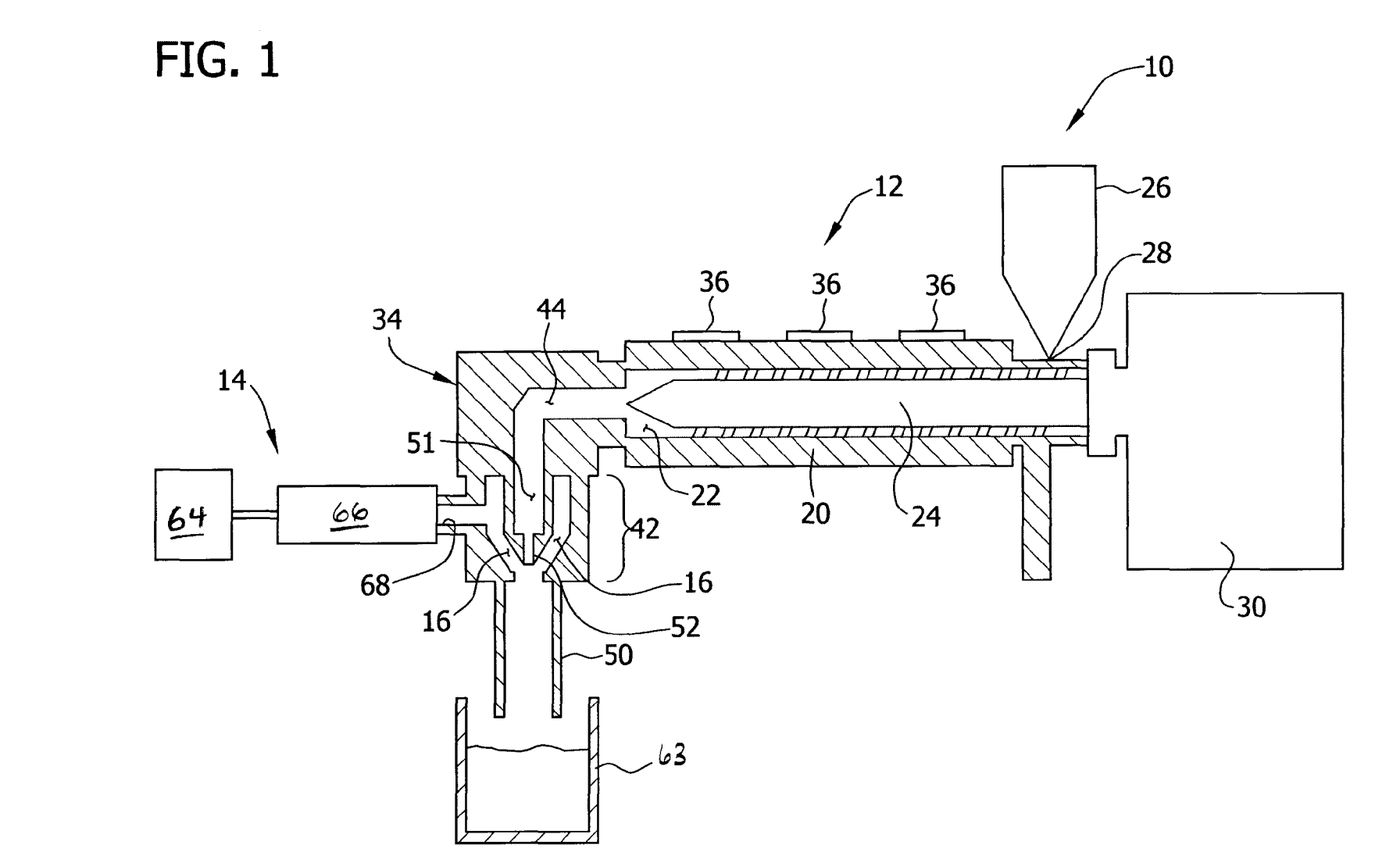
FIG. 1 is a schematic of an embodiment of a micropelletization apparatus.
Figure 5:
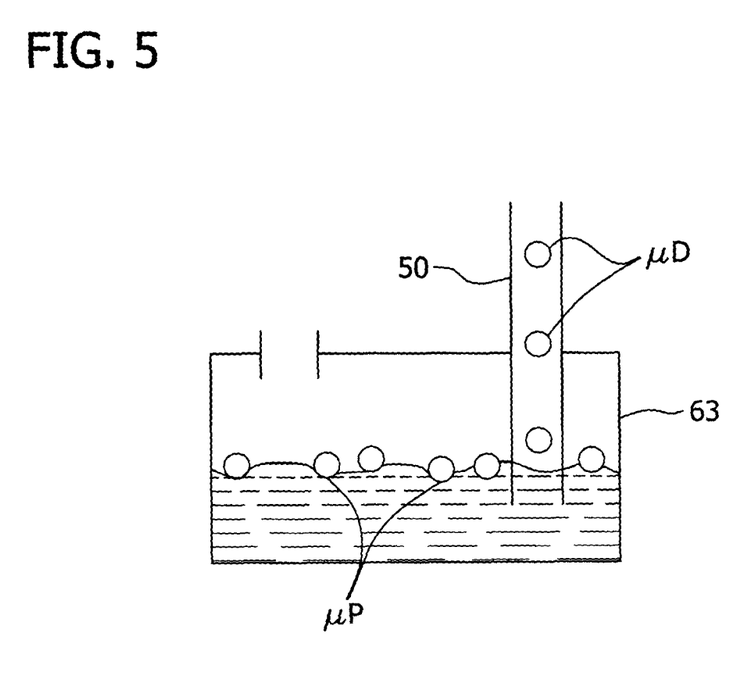
FIG. 5 is a schematic of first embodiment of a cooling source, in the form of a water bath, of the micropelletization apparatus of FIG. 1.
Figure 6:
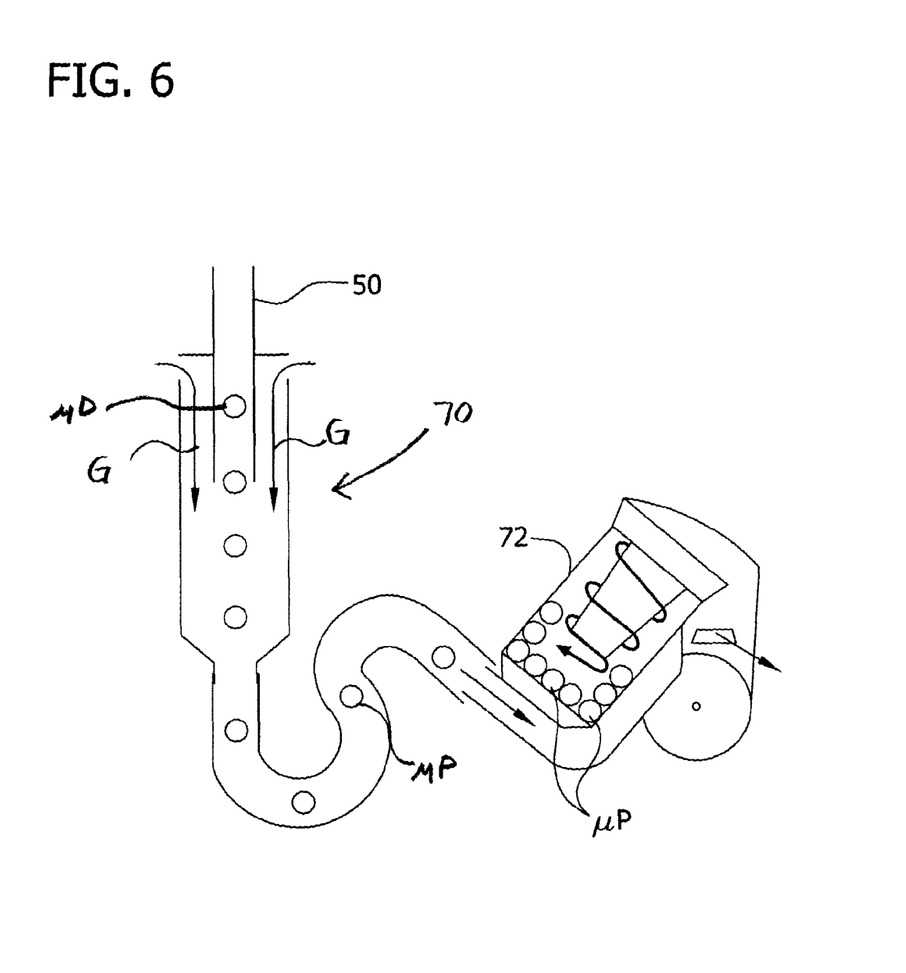
FIG. 6 is a schematic of second embodiment of a cooling source, in the form of a cooling tube and cyclonic separator.

Referring to FIG. 1, an embodiment of a micropelletization apparatus is generally indicated at 10. The illustrated micropelletization apparatus 10 comprises an extruder, generally indicated at 12, a source of pressurized, heated gas, generally indicated at 14, and a gas passage 16 adjacent to an outlet of the extruder and in fluid communication with the source of pressurized gas. The micropelletization apparatus 10 is adapted to form material into micropellets $\mu P$ (FIGS. 5 and 6). As defined herein, a micropellet $\mu P$ is a discrete unit, in solid state, having a cross-sectional dimension (e.g., diameter, or major axis) that is less than or equal to 2.0 mm, and a shape that is of any suitable shape. As explained in more detail below, the extruder 10 is configured to form a melt thread MT of material (FIGS. 2-4), such as polymer melt thread. The source of pressurized gas 14 is configured to deliver a suitable flow of gas (indicated by arrows G) to the gas passage 16 such that the gas passage 16 directs the flow of gas to the melt thread MT to stretch or elongate the thread, thereby causing the formation of Rayleigh disturbances and leading to the melt thread breaking up into discrete microdroplets $\mu D$. The microdroplets $\mu D$ are solidified (e.g., cooled) to form discrete micropellets $\mu P$ (shown schematically in FIGS. 2 and 4).

Referring to FIG. 1, the extruder 12 is a screw-type extruder, although the extruder may be another type without departing from the scope of the present invention. The illustrated extruder 12 comprises a heated barrel 20 defining an interior passage 22 in which a screw or auger 24 is rotatably secured. A hopper 26 is configured to hold a quantity of material to be micropelletized. The material may be in powdered form, such as pellets having diameters of 2 mm or larger. The hopper 26 is connected to an inlet 28 of the barrel 20, which is adjacent to a longitudinal end of the barrel. The hopper 26, or some other device (e.g., a valve) associated with the hopper, regulates the delivery of the material into the barrel 20. The auger 24, which is rotatably driven by a motor 30 or some other actuator, moves the material along the length of the interior passage 22, from the inlet 28 toward an extrusion die, generally indicated at 34, which is adjacent to an opposite longitudinal end of the barrel. As the auger 24 moves the material longitudinally within the interior passage 22, the material absorbs heat from extruder heaters 36 and liquefies (i.e., melts) into a melt M before reaching the extrusion die 34. For reasons set forth below, the heaters 36 may be configured to output an adjustable heat flux so as to allow a user to control the temperature of the melt M flowing to the extrusion die 34.

Figure 2:
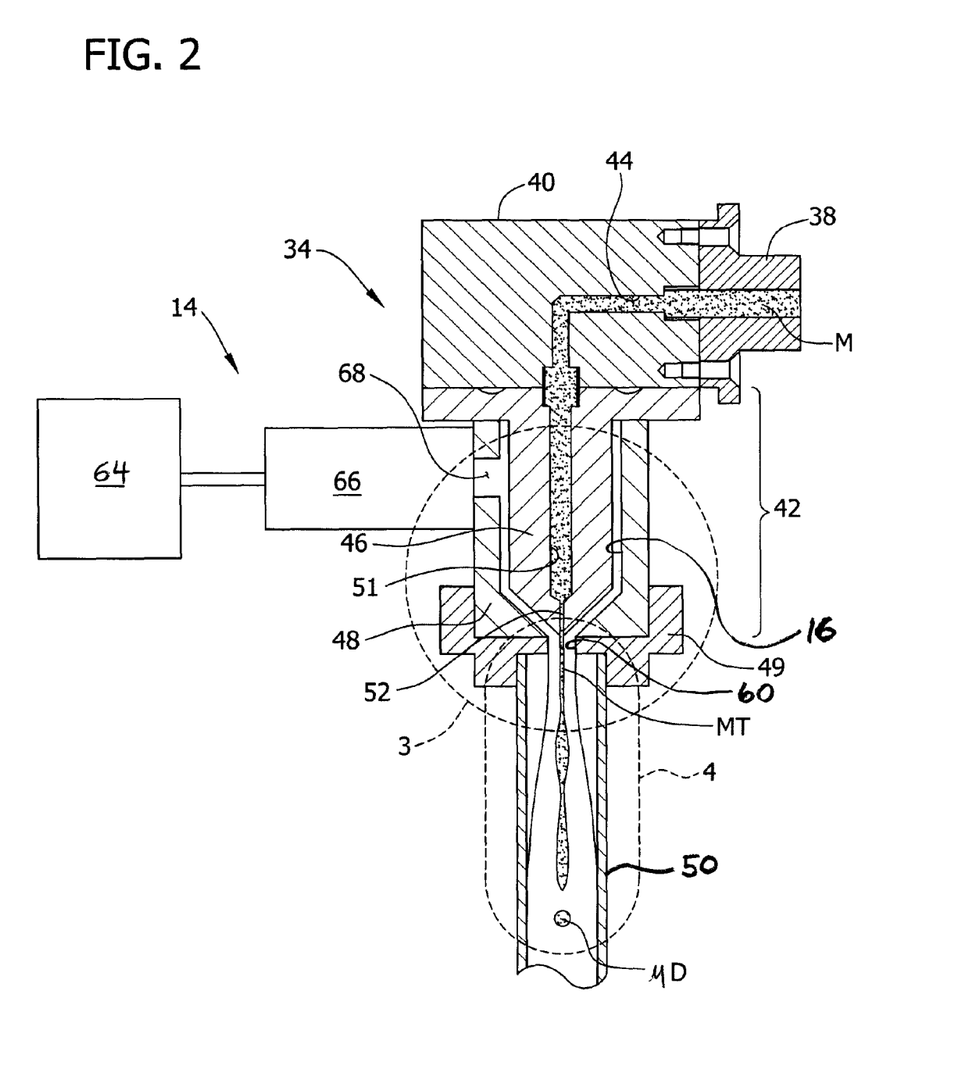
FIG. 2 is a cross-sectional schematic of an extrusion die of the micropelletization apparatus of FIG. 1.

As seen best in FIG. 2, the extrusion die 34 of the illustrated embodiment includes an adapter 38, a transition block 40 and a nozzle 42. The adapter 38 and the transition block 40 together define an inner delivery passage 44 that delivers the melt M from the barrel 20 to the nozzle 42. The adapter 38 is secured directly to the barrel 20 and the transition block 40. The portion of the delivery passage 44 defined by the transition block 40 has a 90° angle to direct the flow of the melt M from a horizontal direction to a downward direction. Each component of the extrusion die 34 may be formed from stainless steel, such as stainless steel AISI 304, or from other suitable material. It is understood that some or all of the components of the extrusion die 34 may integrally formed or formed separately.

As seen best in FIG. 2, the nozzle 42 includes a mandrel 46, a collar 48 coaxially coupled to the mandrel 46, and a coupler 49 attaching a guide tube 50 to the collar, downstream of the nozzle. Although not shown, a heater may surround or otherwise be in thermal contact with the nozzle 42 for heating the nozzle to a selected temperature. The mandrel 46 defines a melt orifice 51 in fluid communication with the delivery passage 44. The melt orifice 51 has a thread-forming portion 52 (FIG. 3) at an outlet of the melt orifice. The thread-forming portion 52 has a suitable size and shape for forming the melt M into a melt thread MT of a desired size and shape as it exits the outlet of the orifice 51. For example, the thread-forming portion 52 may be generally cylindrical, having a diameter of less than or equal to about 1 mm, and a length of about 22.5 mm. The thread-forming portion 52 may have other dimensions without departing from the scope of the present invention. In the illustrated embodiment, the melt thread MT exits the melt orifice 51 such that the melt thread flows downward from the orifice. Other configurations are within the scope of the present invention. Moreover, other ways of forming the melt thread MT of the material, other than extrusion, do not depart from the scope of the present invention.

Figure 3:
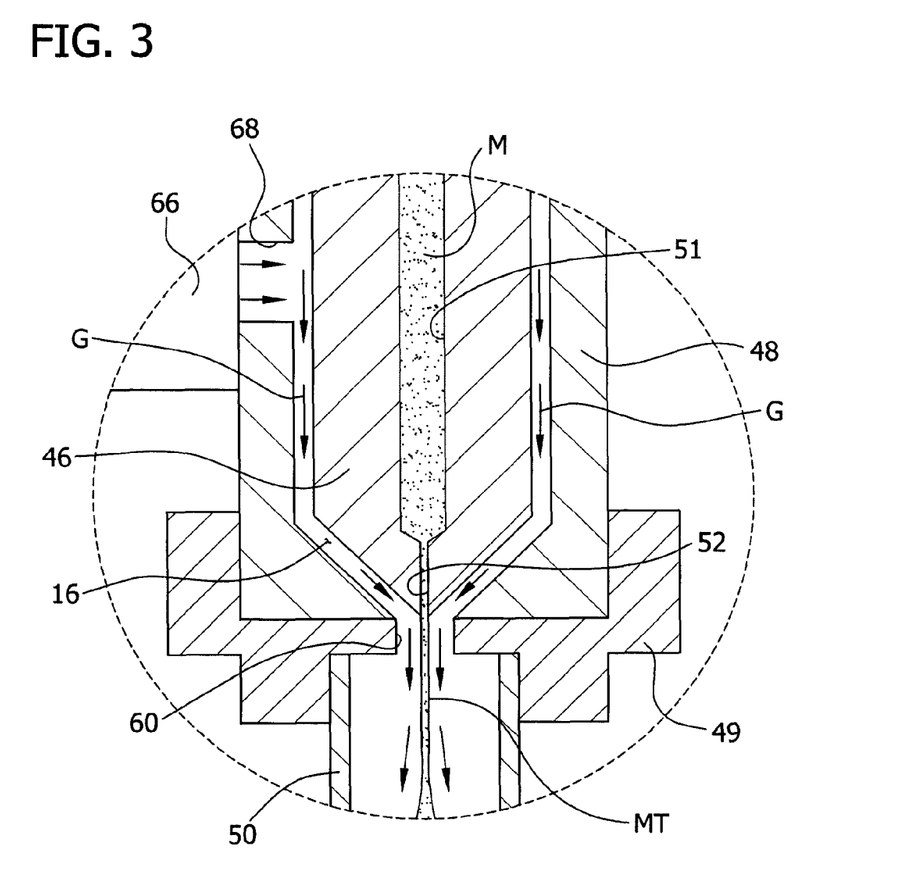
FIG. 3 is an enlarged, partial view of a nozzle and guide tube of the extrusion die of FIG. 2.

Referring still to FIG. 3, the collar 48 has an inner surface defining an interior space in which the mandrel 46 is received. The interior space has a shape corresponding generally to the shape of the mandrel, and a circumference that is slightly larger than the circumference of the mandrel so that together, the interior surface of the collar 48 and an exterior surface of the mandrel 46 define the gas passage 16. In the illustrated embodiment, the gas passage 16 extends from a location above the outlet of the melt orifice 51 (i.e., a location upstream of the outlet of the melt orifice with respect to the direction of the flow of the melt M) to a location below the outlet of the melt orifice (i.e., at a location downstream of the outlet of the melt orifice with respect to direction of the flow of the melt). The gas passage 16 surrounds the outlet of the melt orifice 51, such that the flowing gas (indicated by arrows G) from the source of pressurized gas 14 contacts the melt thread MT and flows generally alongside the melt thread as the melt thread exits the melt orifice, as explained in more detail below.

Figure 4:
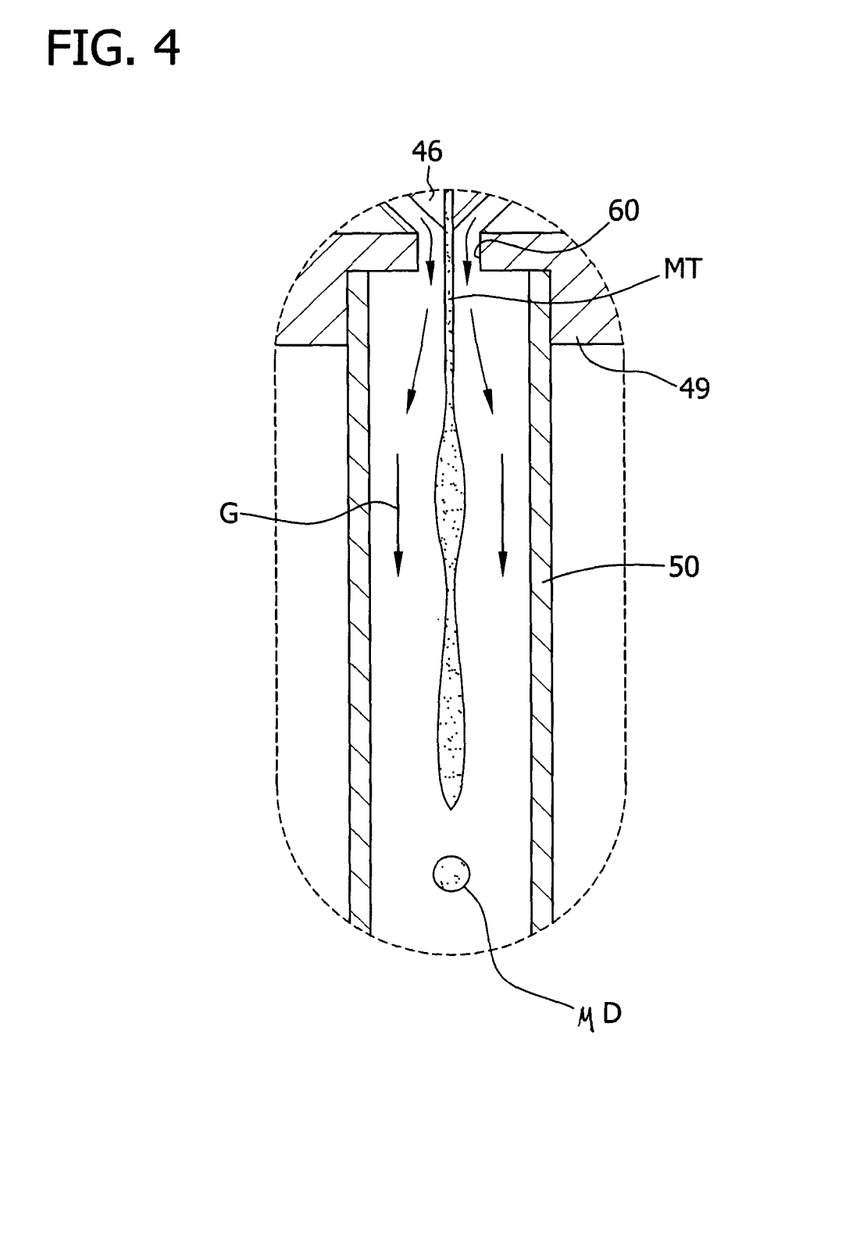
FIG. 4 is an enlarged, partial view of the guide tube and a thread-gas orifice of the nozzle of FIG. 3.

Referring to FIGS. 3 and 4, the collar 48 and the coupler 49 together define a gas-thread orifice 60 downstream from and aligned with the outlet 54 of the melt orifice 51 for allowing the flowing gas G from the gas passage 16 and the melt thread MT from the melt orifice to flow therethrough. The exterior surface of the mandrel 46 and the interior surface of the collar 48 taper 45° toward the gas-thread orifice 60 to direct the flowing gas G toward the gas-thread orifice such that the gas flows generally alongside the melt thread MT. The gas-thread orifice 60 may be formed in other ways without departing from the scope of the present invention. In one suitable embodiment, the gas-thread orifice 60 may have a diameter of about 3 mm or less, and a length of about 5 mm or greater.

As seen best in FIGS. 3 and 4, the gas-thread orifice 60 is upstream of and in fluid communication with the guide tube 50 so that the melt thread MT and the flowing gas G pass through the gas-thread orifice and into the guide tube. As explained in more detail below, the melt thread MT breaks up into the discrete droplets μD in one of or both the gas-thread orifice 60 and the guide tube 50, depending on characteristics of the polymer and process conditions, which affect how quickly the melt thread breaks up into the microdroplets. In the illustrated embodiment, seen best in FIG. 5, the guide tube 50 directs the microdroplets μD to a cooling source 63 where the microdroplets solidify into the micropellets μP. The cooling source 63 is a receptacle of water in the illustrated embodiment of FIGS. 1-5.

In another embodiment illustrated in FIG. 6, a different cooling source, generally indicated at 70, includes a cooling chamber 71. Relatively cool gas G is fluidly connected to the cooling chamber. The cooling chamber 71 receives the falling microdroplets μD from the guide tube 50, and the cool gas G introduced into the chamber cools the microdroplets, as the microdroplets travel along the chamber, to form the micropellets μP. A vacuum device 72 may draw the micropellets into a canister. Other ways of solidifying the microdroplets μD do not depart from the scope of the present invention.

In another non-limiting example (not shown), the guide tube 50 may be configured as drop tube that produces a controlled period of weightlessness for the microdroplets μD, during which the microdroplets μD form into quasi-perfect spheres under their surface tensions and solidify into micropellets μP of quasi-perfect spheres. The drop tube may be backfilled with inert gas or evacuated to create low pressure or vacuum in the tube to provide for free fall of the microdroplets μD, and the tube may have a suitable length an internal temperature for allowing the microdroplets μD to form into quasi-perfect spheres during substantial free fall. The microdroplets μD may fall into a receptacle of water or may be cooled in other suitable ways to form micropellets μP.

Referring to FIGS. 1 and 2, the source of pressurized gas 14 may comprise a gas compressor 64, for pressurizing a gas, and a gas heater 66, such as a heat torch, for heating the gas. It is understood that the source of pressurized gas 14 may have other configurations without departing from the scope of the present invention. In the illustrated embodiment, the compressor 64 receives filtered ambient air, and compresses the air to produce a pressurized flow of air. It is also understood that the gas may be another type of gas, or mixture of gases, other than ambient air. For reasons set forth below, the compressor 64 may be configured to output an adjustable mass air flux so as to allow a user to control the flow of air (or gas) entering the air passage 16. In the illustrated embodiment, the gas heater 66 receives the pressurized air from the compressor 64 and heats the pressurized gas to a desired temperature. After the air is heated, the air flows through a gas passage inlet 68 of the collar 48 and into the gas passage 16. For reasons set forth below, the gas heater 66 may be configured to output an adjustable heat flux so as to allow a user to control the temperature of the air (or gas) entering the gas passage 16. It is understood that the source of pressurized gas 14 may have other configurations without departing from the scope of the present invention. In one non-limiting example, the gas may be heated before it is pressurized. In another non-limiting example, the gas compressor may include a heater that heats the gas. In yet another non-limiting example, the source of pressurized gas may include a tank of compressed gas (e.g., a gas cylinder).

In one example of a method of micropelletizing, a polymer in the form of a powder is fed from the hopper 26 into the heated barrel 20 of the extruder 12. The auger 24 is rotated about its axis, and substantially simultaneously, the powdered polymer is heated by the extruder heaters 36 to melt the polymer into the melt M. The rotating auger 24 causes the melt M to flow toward the extrusion die 34 such that pressure builds at the die to force the melt through the melt orifice 51. The melt M exits the outlet of the melt orifice 51 as a melt thread MT. Upon exiting the melt orifice 51, the flowing gas G (e.g., heated air) contacts the melt thread MT and stretches the melt thread such that the thread elongates and decreases or tapers in diameter (i.e., cross-sectional dimension) lengthwise. The melt thread MT continues to reduce in diameter under the flow of the gas G as the thread flows through the gas-thread orifice 60, and the surface tension of the thread leads to Rayleigh disturbances in the thread (illustrated schematically in FIGS. 2 and 4). Theoretically, and as explained in more detail below, the Rayleigh disturbances will lead to the melt thread MT breaking up into discrete microdroplets μD when the critical capillary number of the melt thread is reached, which may occur in one of or both the gas-thread orifice 60 and the guide tube 50. The microdroplets μD travel through the guide tube 50 and solidify into micropellets μP either within the guide tube or at a cooling source 63 (e.g., water) at the end of the guide tube. The micropellets μP may then be separated from the cooling source 63, if necessary, and further processing, such as separation and quality control, may be performed.

Polymers that are suitable for micropelletizing using the disclosed pelletization apparatus and exemplary method include, but are not limited to, poly(lactic) acid (PLA), polyethylene, polystyrene, polyvinyl chloride, and polytetrafluoroethylene (PTFE).

Theoretical Example

This theoretical example is based on assumptions that the material is a polymer, the melt thread is extruded, and the flow of gas along the melt thread is heated air. This theoretical example may be used in assessing the processing requirements for forming micropellets of different materials. Theoretically, the capillary number of the melt thread MT determines whether the thread will break up into microdroplets μD in the flowing air. The capillary number is $$Ca = \frac{\tau R}{\sigma_s}$$

where $\tau$ is the flow induced or deviatoric stress, R is the characteristic dimension of the melt thread MT or microdroplet μD, and us is the surface tension that acts on the thread and resulting microdroplet μD. The capillary number is the ratio of flow stresses to microdroplet surface stresses. Break-up occurs when a critical capillary number, $Ca_{crit}$, is reached. Because of the continuously decreasing melt thread MT diameter, the critical capillary number will be reached at some specific point in time. Due to the competing deviatoric stresses and surface forces, the cylindrical shape of the melt thread (in the theoretical example) becomes unstable and small disturbances at the surface lead to a growth of capillary waves. These waves are commonly referred to as Rayleigh disturbances. Disturbances with various wavelengths form on the cylinder surface, but only those with a wavelength greater than the circumference ($2\pi R_0$) of the melt thread MT lead to a monotonic decrease of the interfacial area.

Break-up is implied when Ca is close to the value of the critical Ca or when interfacial stresses are almost equal to the deviatoric stresses causing droplet break-up. In addition, break-up can only occur if enough time is given for this to happen. The disturbance amplitude, $\alpha$, is assumed to grow exponentially as $$\alpha = \alpha_0 e^{qt}$$

where $\alpha_0$ is the initial disturbance amplitude, sometimes assumed to be 0.3% of the melt thread MT radius, and the growth rate q is defined by $$q = \frac{\sigma_s \Omega}{2\eta_1 R_0}$$

In the above equation $R_0$ represents the initial radius of the thread and $\Omega$ a dimensionless growth rate as a function of viscosity ratio for the wavelength disturbance amplitude which leads to break-up. The time required for break-up, $t_b$, can now be computed using the above equations as $$t_b = \frac{1}{q} \ln\left(\frac{\alpha_b}{\alpha_0}\right)$$

where $\alpha_b$ is the amplitude at break-up which for a sinusoidal disturbance is $$\alpha_b = \sqrt{2/3} R_0$$

The break-up time decreases as the critical capillary number is exceeded. The reduced break-up time $t_b^*$ can be approximated using $$t_b^* = t_b \left(\frac{Ca}{Ca_{crit}}\right)^{-0.63}$$

Preliminary calculations show that break-up times are only fractions of a second, allowing dispersion inside the die system.

Experimental Example

Experimental testing was conducted using a micropelletization apparatus substantially similar to the micropelletization apparatus illustrated in FIGS. 1-4, with the exception of a heater surrounding the nozzle and being in thermal contact therewith. The extruder was a 19 mm (0.75 Inch) Brabender lab extruder, model 2503, with a Length-to-Diameter-ratio L/D of 25:1. The extruder had three heating bands which are controlled and cooled with compressed air. The screw of the extruder was driven by a 2 KW DC motor which can be varied in screw rotational speed continuously from 0 to 150 rpm. The components of the extrusion die were formed from stainless steel AISI 304. The forming portion of the melt orifice had a diameter of 1 mm and a length of 22.5 cm. The gas-thread orifice had a 3 mm diameter and a length of 5 mm. The gas compressor was capable of producing a maximum airflow of 730 cm$^3$/s. The gas heater was a heat torch having a capacity of 5 KW and was used to heat the compressed air. The heat torch was capable of heating the maximum airflow of 730 cm$^3$/s up to 350° C. The guide tube had an inner diameter of 25 mm and a length of 45.7 cm. The guide tube led to a bath of cool water.

Example 1

Micropelletization of HDPE

Micropelletization of high density polyethylene (HDPE) was conducted. The HDPE had a density of 0.952 g/cm$^3$ and a Melt Flow Index (MFI) of 31.5 g/10 min (190° C., 2.16 kg). The MFI was tested according to ASTM D 1238. The speed of the screw of the extruder was set to 4 rotations per minute (RPM). The air flow from the compressor was set to 5.1 standard cubic feet per minute (SCFM). The temperatures of the three heating bands surrounding the extruder were, from adjacent the hopper to adjacent the die, as follows: 140° C., 150° C., and 150° C. The temperature of the heat torch was set to 130° C. and the temperature of the heater surrounding the nozzle was set to 150° C.

The micropellets of HDPE formed using the pelletization apparatus and the above process parameters. The HDPE micropellets were removed from the water bath using filter paper. In order to characterize the size distribution, the micropellets were sifted in a stack of 10 different sized meshes. The filtered particles were weighed and the mass distribution was calculated into a size distribution. To visualize the result an average diameter between the size of two neighboring meshes was developed. For example, it was assumed that the average diameter of particles, found between the mesh size 75 μm and 125 μm, is 100 μm. The size distribution of the produced HDPE micropellets obtained by sifting ranged from 65 μm to 400 μm, although smaller micropellets could not be determined using the sifting technique. Most micropellets had an average diameter of 168.5 μm.

Figure 7:
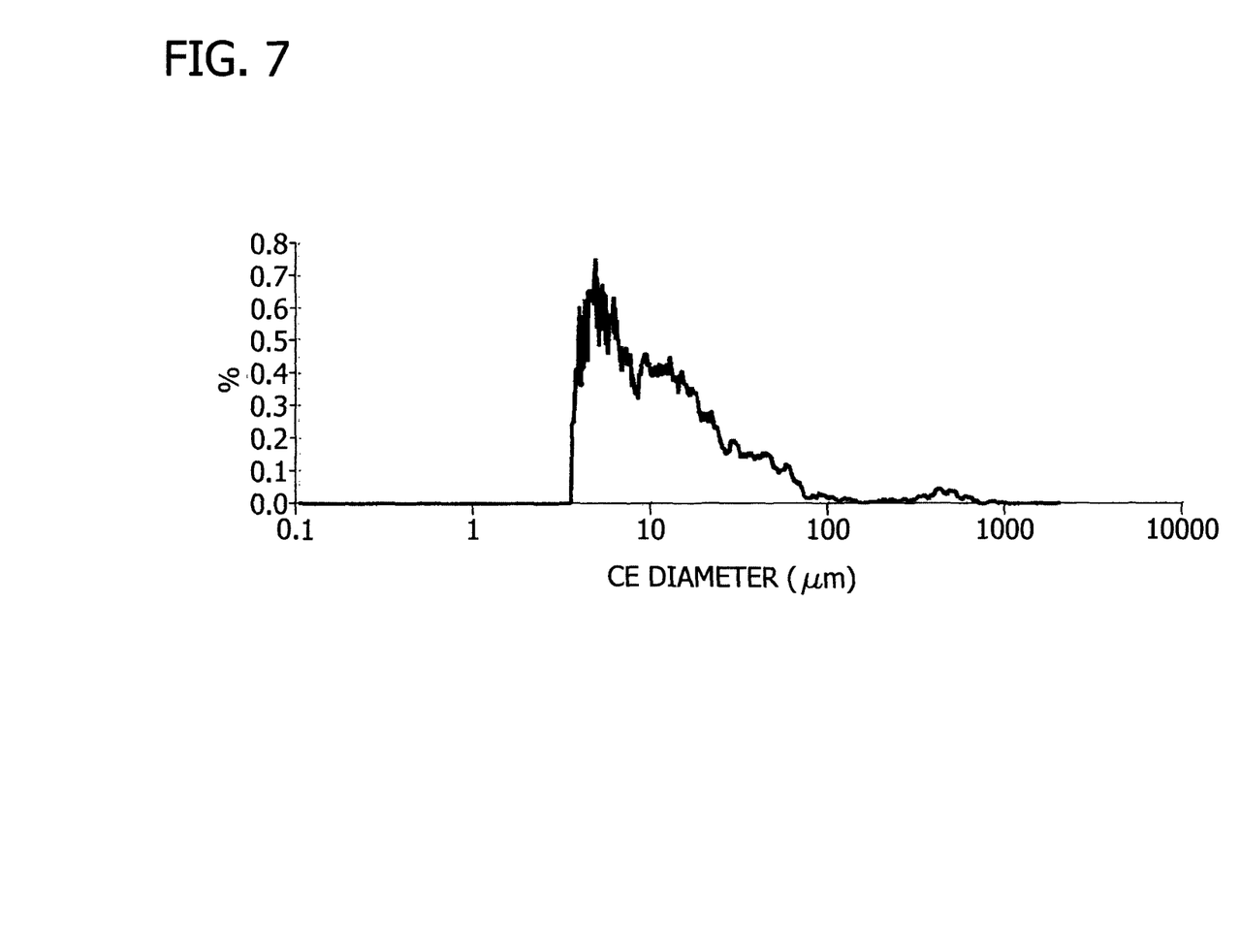
FIG. 7 is a graph depicting the distribution of HDPE micropellets, formed during experimental testing, according CE diameters ($\mu m$) smoothed over 11 points.

The HDPE micropellets were also analyzed using Morphologi® G3, which is an automated particle characterization system available from Malvern Instruments Ltd., Worcestershire, UK. Three characterizations of the HDPE micropellets were obtained. A first characterization obtained was the distribution of the HDPE micropellets according CE diameters (μm) smoothed over 11 points, which is illustrated graphically in FIG. 7. To obtain the CE diameter, the Morphologi® G3 captures individual micropellets as a two-dimensional image, converts the captured two-dimensional image to a circle of the same area, and then determines the diameter of the circle. As can be seen from FIG. 7, a majority number of HDPE micropellets had a CE diameter from about 2 μm to about 80 μm.

Figure 8:
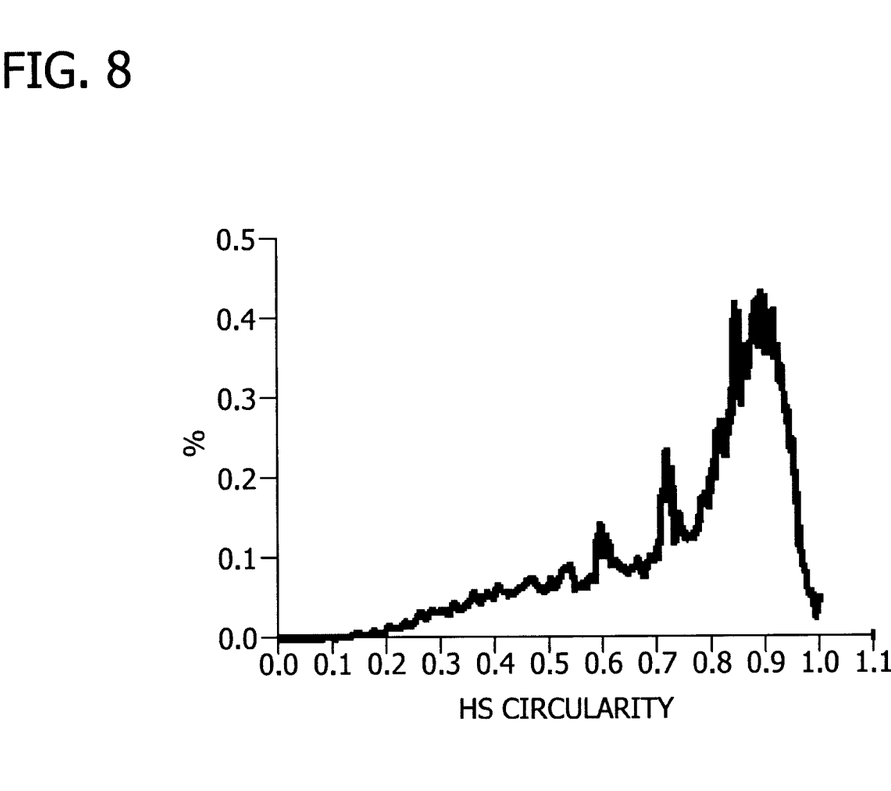
FIG. 8 is a graph depicting the distribution of the HDPE micropellets, formed during experimental testing, according to HS circularities smoothed over 11 points.

A second characterization obtained was the distribution of the HS circularity of the HDPE micropellets smoothed over 11 points, which is illustrated graphically in FIG. 8. The HS circularity characterizes the degree to which the micropellets are circular. The HS circularity is calculated by the Morphologi® G3 using the formula $$HS = 4\pi A/P^2$$

where A is the area of the two-dimensional image of the micropellet, and P is the perimeter of the two-dimensional image of the micropellet. The HS of a perfect circle is 1.

The mean HS circularity of the HDPE micropellets was about 0.75, with a standard deviation of about 0.19 and a relative standard deviation of about 0.25. Moreover, the HS circularity of the 10$^{th}$ percentile was about 0.45, the 50$^{th}$ percentile was about 0.82, and the 90$^{th}$ percentile was about 0.93. The results demonstrate that a majority of the HDPE micropellets were relatively circular.

Figure 9:
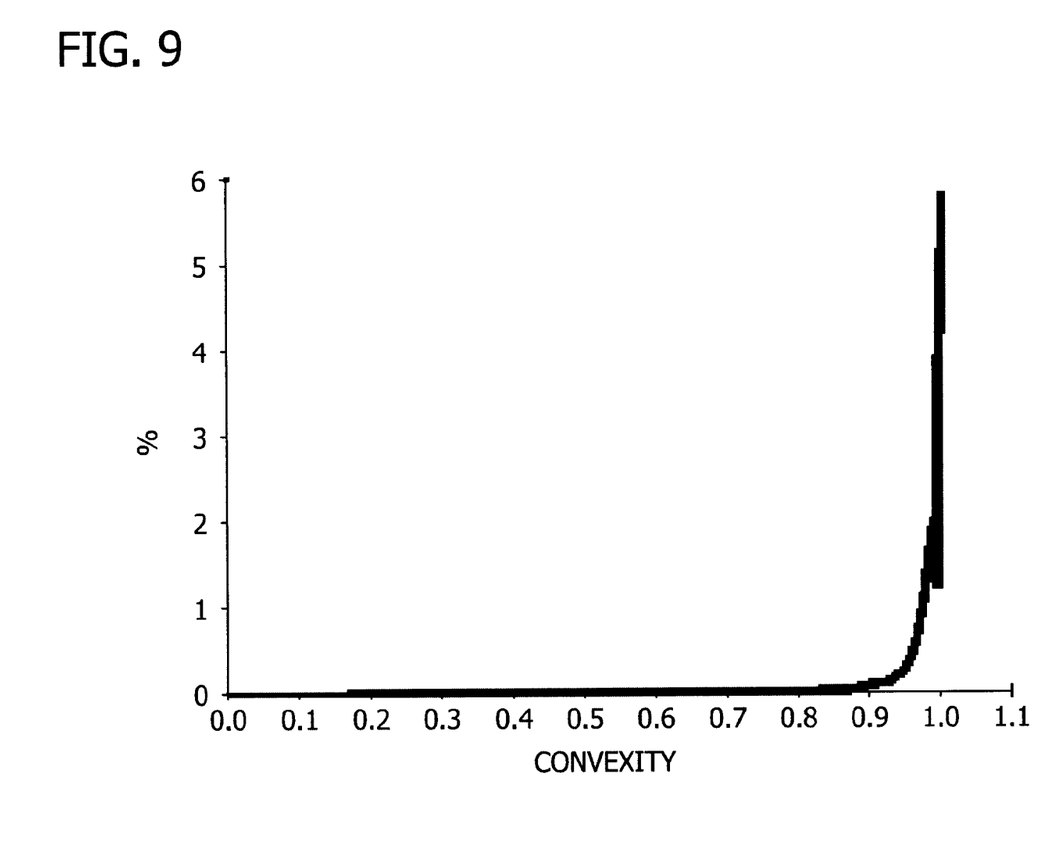
FIG. 9 is a graph depicting the distribution of the HDPE micropellets, formed during experimental testing, according to convexities smoothed over 11 points.

A third characterization obtained was the distribution of the HS circularity of the HDPE micropellets smoothed over 11 points, which is illustrated graphically in FIG. 9. The convexity characterizes the degree to which the micropellets are convex or have convex portions. The convexity is calculated by the Morphologi® G3 using the formula Convexity=convex hull perimeter/particular perimeter.

The convexity of a circle is 1. The mean convexity of the HDPE micropellets was about 0.98, with a standard deviation of about 0.04 and a relative standard deviation of about 0.04. Moreover, the convexity of the 10$^{th}$ percentile was about 0.94, the 50$^{th}$ percentile was about 0.99, and the 90$^{th}$ percentile was about 1.0. The results demonstrate that a majority of the HDPE micropellets were generally convex and generally did not have sharp corners or edges around their perimeters.

Figure 10:
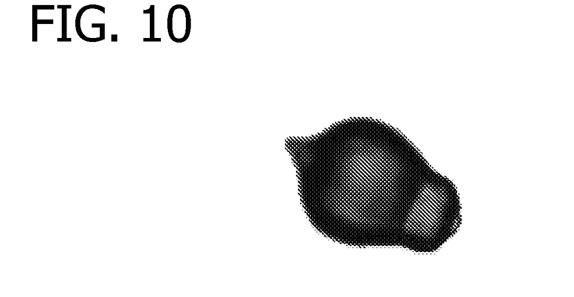
FIG. 10 is an image of a single micropellet formed during experimental testing.
Figure 11:
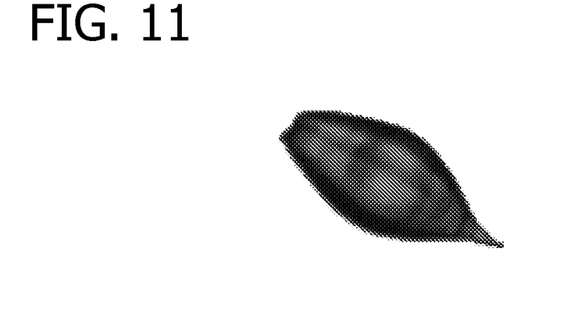
FIG. 11 is an image of another single micropellet formed during experimental testing.
Figure 12:
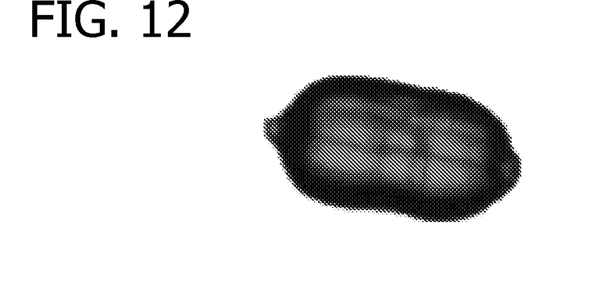
FIG. 12 is an image of yet another single micropellet formed during experimental testing.

Three exemplary HDPE micropellets formed during the above-described testing are provided in FIGS. 10, 11, and 12, respectively. The HDPE micropellet in FIG. 10 has a CE diameter of about 444.4 μm, an HS circularity of about 0.75, and a convexity of about 0.94. The HDPE micropellet in FIG. 11 has a CE diameter of about 446.8 μm, an HS circularity of about 0.61, and a convexity of about 0.95. The HDPE micropellet in FIG. 12 has a CE diameter of about 447.1 μm, an HS circularity of about 0.79, and a convexity of about 0.97.

Example 2

Micropelletization of LDPE

Additional testing was performed using low density polyethylene (LDPE). The LDPE had a density of 0.923 g/cm$^3$ and a MFI of 26 g/10 min, (190° C., 2.16 kg). The same micropelletization apparatus used for HDPE was used for LDPE. Processing parameters were modified from the processing conditions of the HDPE to produce micropellets. Using the sifting technique discussed with respect to the HDPE, the LDPE micropellets ranged in size between 168.5 μm and 605 μm, although smaller micropellets could not be detected using the sifting technique.

Example 3

Micropelletization of PLA

Additional testing was performed using poly(lactic) acid (PLA) (NatureWorks 3051D), The PLA had a density of 1.24 g/cm$^3$ and an MFI of 30 g/10 min (190° C., 2.16 kg). The same micropelletization apparatus used for HDPE and LDPE was used for PLA. Processing parameters were modified from the processing conditions of the HDPE and LDPE. In particular, the speed of the screw of the extruder was set to 6 rotations per minute (RPM). The air flow from the compressor was set to 3 standard cubic feet per minute (SCFM). The temperatures of the three heating bands surrounding the extruder were, from adjacent the hopper to adjacent the die, as follows: 165° C., 180° C., and 190° C. The temperature of the heater surrounding the nozzle was set to 170° C.

Through the experimental testing and analysis, it is believed that shape, size and uniformity of micropellets μP produced by forming Rayleigh disturbances in the melt thread and breaking up the melt thread into discrete microdroplets may be selectively controlled by regulating or adjusting at least one of the following parameters of the micropelletization apparatus 10: a) mass flux of the melt through the forming orifice (e.g., controlling rotation speed of auger 24); b) temperature of the melt (e.g., controlling heat flux of the extruder heaters 36); c) temperature of the gas (e.g., controlling heat flux of gas heater 46); d) mass air flux into the gas passage 16 (e.g., controlling the gas compressor 44); e) solidification time of microdroplets μD (controlling the length of the guide tube 42 and/or cooling source 43). Moreover, the cross-sectional dimension (e.g., diameter) of the forming orifice 38 may also affect the size, shape, and uniformity of the micropellets μP. In addition to the parameters of the micropelletization apparatus 10, the melt flow index (MFI) of the material (e.g., polymer) is a parameter that affects the shape, size and uniformity of micropellets μP.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of micropelletizing a material, the method comprising:
    forming a melt thread of the material;
    directing a flowing gas to the melt thread to form Rayleigh disturbances in the melt thread and break up the melt thread into discrete microdroplets; and
    solidifying the discrete microdroplets to form micropellets.

2. The method set forth in claim 1 wherein the material comprises a polymer.

3. The method set forth in claim 1 wherein the polymer comprises at least one of a polyethylene, polystyrene, polyvinyl chloride, and polytetrafluoroethylene (PTFE).

4. The method set forth in claim 1 wherein the method is for micropelletizing a poly(lactic) acid material, the step of forming a melt thread of the material comprising forming a melt thread of the poly(lactic) acid material.

5. The method set forth in claim 1 wherein the gas is air.

6. The method set forth in claim 1 further wherein said directing a flowing gas comprises directing the flowing air alongside the melt thread.

7. The method set forth in claim 1 wherein said forming a continuous melt thread comprises extruding melt material through an extrusion die.

8. The method set forth in claim 7 wherein said extruding melt material through an extrusion die comprises extruding melt material through a substantially cylindrical melt orifice of the extrusion die.

9. The method set forth in claim 1 wherein said solidifying the discrete microdroplets comprises solidifying the discrete microdroplets during free fall in a drop tube.

10. The method set forth in claim 1 wherein at least some of the micropellets have cross-sectional diameters that are less than about 1 mm.

11. The method set forth in claim 1 wherein at least some of the micropellets have both CE diameters that are less than about 1 mm and HS circularities that are greater than or equal to about 0.75.

12. The method set forth in claim 11 wherein at least some of the micropellets having both CE diameters that are less than about 1 mm and HS circularities that are greater than or equal to about 0.75 also have convexities that are greater than or equal to 0.90.

13. The method set forth in claim 1 wherein at least some of the micropellets have cross-sectional diameters that are less than about 500 microns.

14. An apparatus for micropelletizing a material comprising:
    an extruder for extruding a continuous melt thread of the material, the extruder comprising an extrusion die having a melt orifice through which the melt thread exits the extruder;
    a source of pressurized gas;
    a gas passage in fluid communication with the source of pressurized gas and adjacent to the melt orifice of the extrusion die, the gas passage being configured to direct pressurized gas from the source of pressurized such that the pressurized gas flows generally alongside and generally parallel to the melt thread as the melt thread exits the extruder,
    wherein the source of pressurized gas and the gas passage are configured to produce a suitable flow of gas through the gas passage such that Rayleigh disturbances are formed in the melt thread and the melt thread breaks up into discrete microdroplets.

15. The apparatus set forth in claim 14 wherein the source of pressurized gas comprises a gas compressor and a gas heater for heating the gas.

16. The apparatus set forth in claim 14 wherein the melt orifice has a diameter of less than or equal to 1 mm.

17. The apparatus set forth in claim 14 further comprising a guide tube through which the microdroplets travel.

18. The apparatus set forth in claim 17 wherein the guide tube is configured as a drop tube, wherein the drop tube is configured to allow the discrete microdroplets to form into micropellets during free fall in the drop tube.

19. The apparatus set forth in claim 14 further comprising a receptacle of cooling liquid at the end of the guide tube.

20. The apparatus as set forth in claim 14 wherein the apparatus is for micropelletizing a poly(lactic) acid material, the apparatus further comprising a source of poly(lactic) acid material, the extruder being in communication with the source of poly(lactic) acid material.

* * * * *